United States Patent [19]
Cywin

[11] 3,760,868
[45] Sept. 25, 1973

[54] DISPOSAL OF WASTE HEAT
[75] Inventor: Allen Cywin, Alexandria, Va.
[73] Assignee: The United States of America as represented by the Secretary of the Interior, Washington, D.C.
[22] Filed: Jan. 28, 1971
[21] Appl. No.: 110,430

[52] U.S. Cl............................ 165/1, 165/66, 165/45
[51] Int. Cl............................................... A23c 3/02
[58] Field of Search........................... 165/1, 45, 66

[56] References Cited
UNITED STATES PATENTS
3,470,943   10/1969   VanHuisen ........................... 165/45

*Primary Examiner*—Charles Sukalo
*Attorney*—Ernest S. Cohen and Roland H. Shubert

[57] ABSTRACT

An urban domestic water distribution system and its associated ground mass is used as a heat sink for waste heat produced by industrial processes. A domestic water stream is utilized as cooling water for waste heat-producing processes and is thereafter introduced into the distribution system.

2 Claims, 2 Drawing Figures

PATENTED SEP 25 1973 3,760,868

INVENTOR
ALLEN CYWIN

BY
ATTORNEYS

DISPOSAL OF WASTE HEAT

BACKGROUND OF THE INVENTION

Many industrial processes use surface water from rivers and lakes for cooling purposes. Usually the water is returned to the same source but at a temperature typically some 15°F higher. Such a substantial change in water temperature may adversely affect the aquatic ecology and this effect is commonly referred to as "thermal pollution."

The greatest single source of waste heat discarded to surface waters is electrical power generation, either from nuclear or fossil fuel generating plants. Amount of water withdrawn for this purpose alone in the United States is estimated to be about 40 trillion gallons annually; or a rate of over one million gallons per second. Power generation in the United States has doubled every 10 years since 1945 and indications are that the future rate of increase will be even greater. Compounding the problem are the increased size of individual power plants and the greater quantity of waste heat produced by equivalent sized plants when nuclear reactors are used.

SUMMARY OF THE INVENTION

Domestic water is used as a cooling medium to absorb waste heat produced by industrial processes. Heated domestic water is then passed to a municipal water distribution system to thereby utilize the distribution system and the surrounding ground mass as a heat sink.

Hence, it is an object of my invention to reduce the ecological impact of waste heat release.

A specific object of my invention is to utilize a domestic water distribution system and its associated ground mass as a heat sink for waste heat produced by industrial processes.

DETAILED DESCRIPTION OF THE INVENTION

My invention will be more clearly understood by reference to the accompanying drawings in which.

Figure 1:
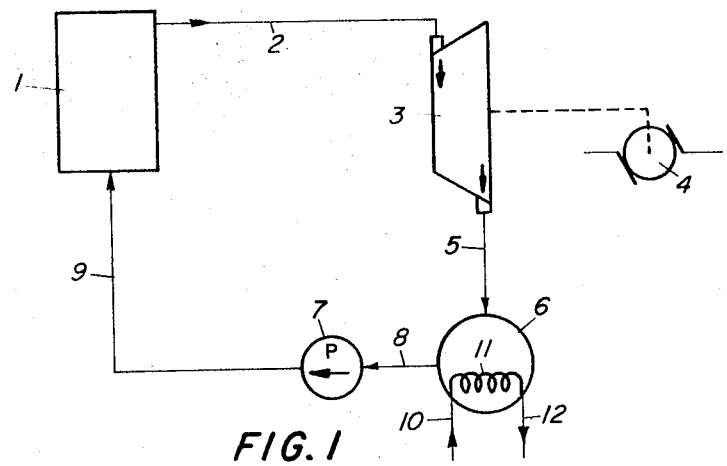
FIG. 1 represents a conventional, steam cycle, thermal power plant modified in accordance with my invention.

Referring now to FIG. 1, there is shown one embodiment of my invention. High pressure steam generated by boiler or reactor 1 is passed via conduit means 2 to turbine 3 which is coupled to generator 4. Low pressure, turbine exhaust steam passes via 5 to condenser 6 and the condensed steam is recycled by way of feed water pump 7 and conduits 8 and 9 back to the boiler or reactor. This of course constitutes the conventional steam cycle, thermal power plant.

Condenser 6, typically of shell and tube construction, is cooled by means of a water stream, entering by way of conduit means 10, passing through heat exchange means or tube bundle 11 and exiting via conduit 12. In the conventional steam cycle power plant, source of the cooling water is often a river or lake. Cooling water discharged from the condenser is typically at a temperature about 15°F higher than the incoming stream and is often returned to the same water body. This practice often results in far reaching changes in the local aquatic environment because of the vast quantities of water used for cooling.

In my invention, I utilize the soil mass surrounding the mains and laterals of a municipal domestic water distribution system as a heat sink for the wast heat produced as a by-product of power generation. I substitute a municipal potable water supply stream for the cooling water sources conventionally used and in so doing, I avoid thermally induced ecological effects on the aquatic environment. In my invention, cooling water stream 10 comprises a potable domestic water supply stream. After absorbing heat in heat exchange member 11, the stream is passed to the distribution network making up a municipal water supply system. Such a system with its many miles of mains and laterals functions as a heat exchanger having a vast surface area. Water introduced into such a distribution system tends to reach temperature equilibrium with the surrounding ground mass. Thus, waste heat from a power plant or other industrial process is distributed over a wide area, often a hundred square miles or more.

Depending upon the quality of surface waters ordinarily used for cooling purposes, some treatment of the water is often necessary in order to prevent fouling and plugging of the heat exchangers. By using a city water supply, either before or after treatment, as a cooling water stream, my process avoids these special expenditures for cooling water treatment.

Figure 2:
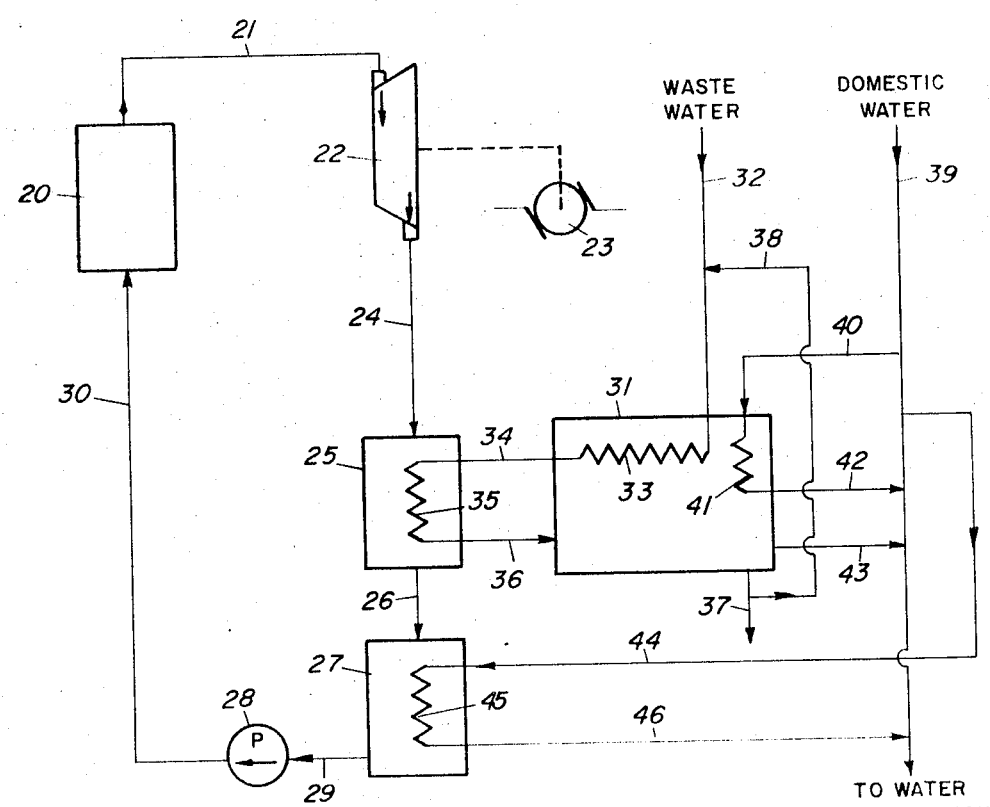
FIG. 2 is another embodiment of my invention in which additional quantities of potable water are produced by the waste heat source.

FIG. 2 depicts another embodiment of my process. Like in FIG. 1, high pressure steam is generated in boiler or reactor 20 and passed via line 21 to turbine 22 which is coupled to generator 23. Low pressure turbine exhaust steam is passed via means 24 to a first condenser 25 where at least a part of the steam is condensed. Uncondensed residual steam is then passed via conduit means 26 to final condenser 27. Condensers 25 and 27 need not be separate units but may comprise a single condenser having multiple tube banks or condensing zones. In some cases, it may be advantageous to dispense with second condenser or condensing zone 27 and utilize only the cooling effect of zone 25. Condensed steam is passed from the condensers to pump 28 via line 29 and is recirculated to the boiler by way of conduit 30.

Heat extracted from the low pressure steam in condenser 25 is utilized to drive a distillation unit 31 in a fashion similar to that employed in multipurpose plants for the production of electricity and distillation of sea water. In my invention, a waste water stream 32 is utilized as the feed stream for distillation unit 31. Waste stream 32 may comprise a partially treated domestic or industrial sewage effluent. A typical and preferred waste water feed stream is the effluent from a conventional sewage treatment plant. This stream is introduced into heat exchange members 33 of distillation unit 31 where the stream absorbs heat by condensing vapors from the distilling or evaporating waste water. The waste water stream is then passed via line 34 to heat exchange member 35 located within condenser 25. There the waste stream acts as a cooling and condensing medium for low pressure turbine exhaust stream and is in turn heated. Temperature maintained within condenser 25 will typically range from about 140° to about 200°F.

From condenser 25, the hot waste stream is passed to the flashing zones of the distillation unit 31. This unit preferably comprises a multistage or multieffect evaporator system. Particularly preferred for use in my process is a distillation unit of the multieffect, long-tube-vertical type. Such a unit is shown for example in U.S. Pat. No. 3,303,106. Obtained as a product from the distillation step is fresh water stream 43. Also removed from the distillation is a concentrated waste stream 37, the major portion of which is recycled via line 38 and merged with incoming waste stream 32 as is conventional in the art.

In order to drive any distillation process, heat must be rejected at the lowest temperature level. At this point my process diverges most sharply from prior art practices. I utilize a domestic water stream as a heat absorbing medium for the combined distillation and power generation cycles. This is accomplished by passing at least a portion of the domestic water stream 39, via line 40, through heat exchange surfaces 41 located within distillation unit 31 to absorb reject heat from that unit and so drive the distillation process. After absorbing heat at the lowest temperature levels of the distillation process, the water stream is passed from the system via line 42 and is merged with the main domestic water stream 39. Likewise, pure water produced by the distillation process is merged with the domestic water by way of conduit 43. By so merging the distilled product water directly with the domestic supply, two significant advantages are attained. First, the distilled water stream acts as a heat rejecting means thus contributing to the thermal driving force of the distillation process. Secondly, the distilled water is pacified by admixture with the domestic water stream thus avoiding the severe corrosion problem encountered in conveying distilled water in conventional pipes.

A second branch stream 44 is taken from domestic water supply 39 upstream of the merger point with hotter streams 42 and 43 and is passed in indirect heat exchange through heat exchange member or tube bundle 45 of condenser or condensing zone 27. In this unit or zone, final condensation of the low pressure turbine exhaust steam is accomplished. A return stream 46 is then merged with the domestic water and is passed to the water distribution system.

In this manner, the waste heat of a power plant is utilized to enhance the potable water supply of an urban area and is then dissipated harmlessly over a wide geographical area. Ecological disturbances produced by localized concentration of waste heat are avoided.

What is claimed is:

1. A process for reducing thermal pollution of surface waters which comprises:
   a. extracting waste heat from an industrial process by passing a relatively cold water stream in indirect contact heat exchange with a hotter process stream to thereby cool the process stream and warm the water stream, said water stream consisting of a potable, domestic water stream;
   b. passing the warmed domestic water stream into a domestic water distribution system which comprises a substantial length of underground mains and laterals, and
   c. discharging by indirect heat exchange at least a portion of the extracted waste process heat to the soil mass surrounding the mains and laterals.

2. The process of claim 1 wherein the industrial process is thermal power generation and wherein the hotter process stream is low pressure turbine exhaust steam.

* * * * *